(12) United States Patent
Kaitsuka

(10) Patent No.: US 8,015,991 B2
(45) Date of Patent: Sep. 13, 2011

(54) MANIFOLD-TYPE SOLENOID VALVE APPARATUS HAVING STOP VALVE

(75) Inventor: Masanori Kaitsuka, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 760 days.

(21) Appl. No.: 12/133,672

(22) Filed: Jun. 5, 2008

(65) Prior Publication Data

US 2008/0308162 A1  Dec. 18, 2008

(30) Foreign Application Priority Data

Jun. 15, 2007 (JP) ................................. 2007-158587

(51) Int. Cl.
*F15B 13/08* (2006.01)

(52) U.S. Cl. ... 137/269; 137/271; 137/884; 137/625.64; 137/613; 137/614; 251/90; 251/92; 251/93; 251/319; 251/282

(58) Field of Classification Search .............. 137/269, 137/271, 625.64, 613, 614, 614.19, 884; 251/90, 92, 93, 319, 324, 282

See application file for complete search history.

(56) References Cited

U.S. PATENT DOCUMENTS

| | | | | |
|---|---|---|---|---|
| 3,993,091 A | * | 11/1976 | Loveless | 137/269 |
| 4,471,841 A | * | 9/1984 | Rector, Jr. | 166/325 |
| 5,427,144 A | * | 6/1995 | Teets et al. | 137/614.2 |
| 5,699,834 A | * | 12/1997 | Hayashi et al. | 137/884 |
| 5,829,481 A | * | 11/1998 | Tajima et al. | 137/884 |
| 6,012,490 A | * | 1/2000 | Tajima et al. | 137/884 |
| 6,186,161 B1 | * | 2/2001 | Hiramatsu | 137/271 |
| 6,470,912 B1 | * | 10/2002 | Haynes | 137/596 |
| 6,923,207 B2 | * | 8/2005 | Misumi | 137/554 |
| 7,261,127 B1 | * | 8/2007 | Oundjian | 137/625.5 |
| 7,591,280 B2 | * | 9/2009 | Narita et al. | 137/269 |

FOREIGN PATENT DOCUMENTS

| | | |
|---|---|---|
| JP | 53-78628 | 6/1978 |
| JP | 61-197364 | 12/1986 |
| JP | 6-58446 | 3/1994 |
| JP | 2001-280519 | 10/2001 |

* cited by examiner

*Primary Examiner* — Edward Look
*Assistant Examiner* — Minh Le
(74) *Attorney, Agent, or Firm* — Oblon, Spivak, McClelland, Maier & Neustadt, L.L.P.

(57) ABSTRACT

A plurality of solenoid valves are installed on a valve mount surface of a manifold base to receive a pressure fluid supplied from a supply passage of the manifold base via a supply communication hole. A stop valve base connected to a side surface of the manifold base has a stop valve mount surface formed on the upper surface to the side of the valve mount surface. The stop valve is attached to the stop valve mount surface to open and close the supply communication hole by pushing and pulling the stop valve from a side with the solenoid valve.

19 Claims, 8 Drawing Sheets

F I G. 12
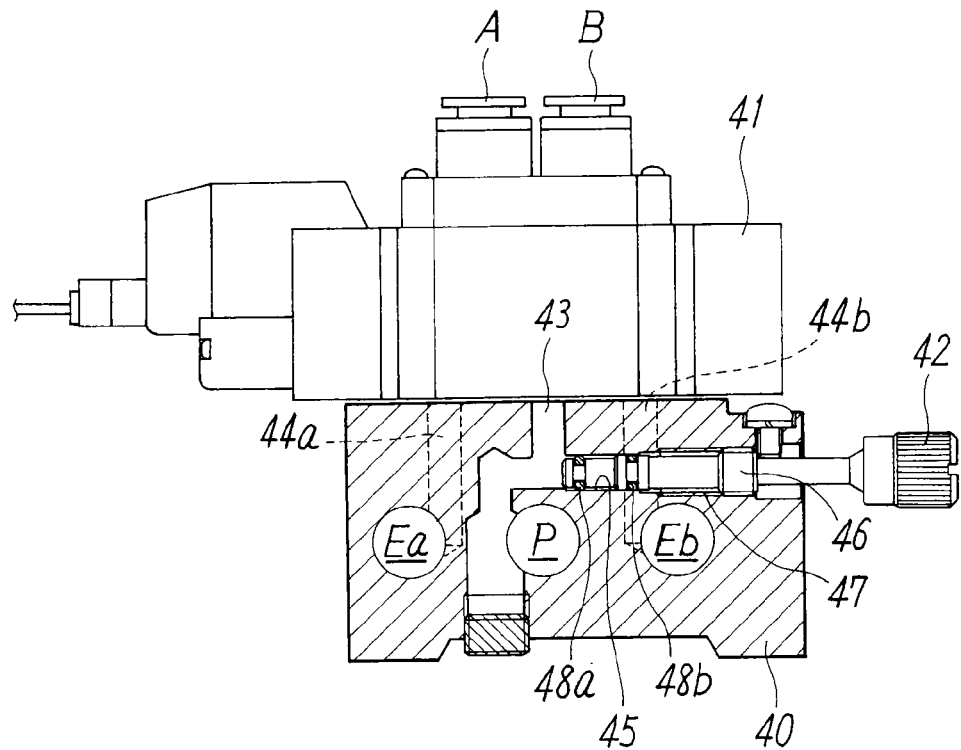
F I G. 13
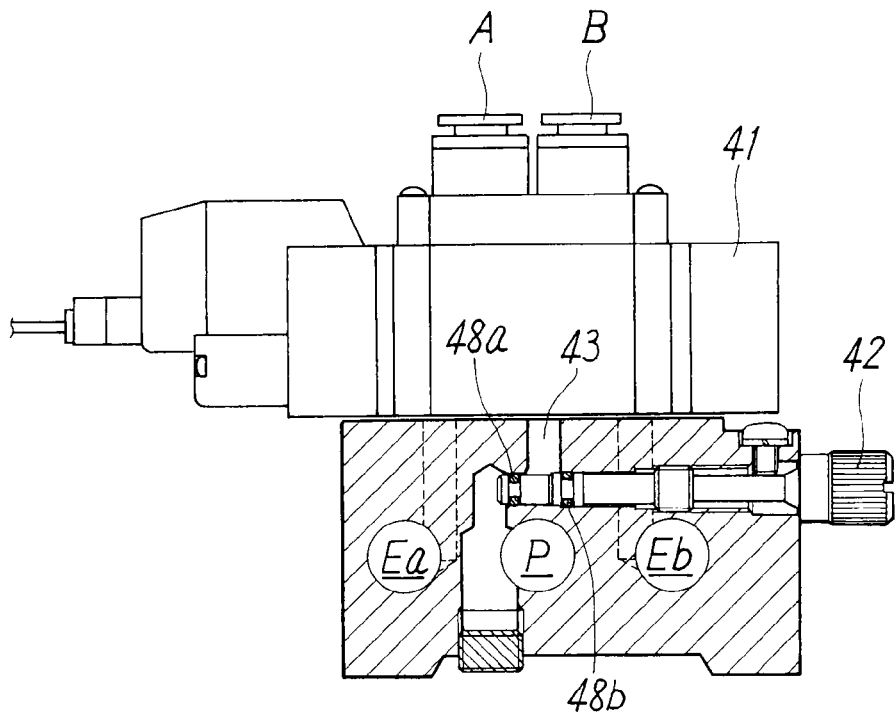

US 8,015,991 B2

MANIFOLD-TYPE SOLENOID VALVE APPARATUS HAVING STOP VALVE

TECHNICAL FIELD

The present invention relates to a manifold-type solenoid valve apparatus formed by installing an solenoid valve on a manifold base, and more specifically, to a manifold type solenoid valve apparatus provided with a stop valve for stopping supply of pressure fluid to the solenoid valve.

BACKGROUND ART

FIGS. 12 and 13 show a generally employed manifold type solenoid valve apparatus having stop valve. The solenoid valve apparatus is formed by installing a plurality of solenoid valves 41 on an upper surface of a manifold base 40, and providing stop valves 42 as many as the solenoid valves 41 on a side surface of the manifold base 40.

A supply passage P and discharge passages Ea and Eb are formed inside the manifold base 40. A supply communication hole 43 and discharge communication holes 44a and 44b branched from the supply passage P and the discharge passages Ea and Eb, respectively are communicated with the respective solenoid valves 41 via the upper surface of the manifold base 40. The pressure fluid such as air and liquid is supplied from the supply passage P to the respective solenoid valves 41 via the supply communication hole 43, and the pressure fluid discharged from the respective solenoid valves 41 flows from the discharge communication holes 44a and 44b via the discharge passages Ea and Eb. Outlet ports A and B for outputting the pressure fluid are attached to each of the respective solenoid valves 41.

The stop valve 42 has its male screw 46 fit with a female screw 47 inside a valve hole 45 laterally formed in the manifold base 40 so as to be retractable through the rotating operation. The stop valve 42 includes two seal members 48a and 48b. When the stop valve 42 is rotated counterclockwise to be retracted to an opening position as shown in FIG. 12, the seal members 48a and 48b are positioned apart from the supply communication hole 43 so as to be opened (communicated). When the stop valve 42 is rotated clockwise to move forward to a closing position as shown in FIG. 13, the supply communication hole 43 is closed (blocked) by the seal members 48a and 48b.

The stop valve 42 is normally set at the opening position as shown in FIG. 12. Upon maintenance or replacement of the solenoid valve 41, the stop valve 42 is moved forward to the closing position as shown in FIG. 13 such that the supply communication hole 43 is closed to stop supply of the pressure fluid to the corresponding solenoid valve 41.

In the generally employed solenoid valve apparatus, the stop valve 42 is attached onto the side surface of the manifold base 40 so as to be retractable in a lateral direction. In the case where the solenoid valve apparatus is disposed in a narrow place or the other apparatus is disposed adjacent to the solenoid valve apparatus, it is difficult to operate the stop valve 42. It is further difficult to retract the stop valve 42 through the rotating operation especially in the narrow place. As the amount of the rotating operation is large relative to the moving distance, it is difficult to realize the quick operation.

DISCLOSURE OF INVENTION

The present invention provides a manifold type solenoid valve apparatus having stop valve which allows easy and quick operations of the stop valve.

The present invention provides a manifold type solenoid valve apparatus having stop valve which includes a manifold base with a valve mount surface on which a solenoid valve is mounted, the solenoid valve installed on the valve mount surface, a stop valve base connected to the manifold base, and a stop valve attached to the stop valve base The manifold base includes a supply passage and discharge passages extending inside the manifold base, and a supply communication hole and discharge communication holes branched from the supply passage and the discharge passages to be opened to the valve mount surface, and the supply communication hole is formed to reach the valve mount surface via the stop valve base. The stop valve base includes a stop valve mount surface on which the stop valve is installed so as to be switchable between a first operation position to open the supply communication hole under a pushing/pulling force applied from a side with the solenoid valve and a second operation position for closing the communication hole.

Preferably, the stop valve mount surface is formed to a side of the valve mount surface in a same direction as that of the valve mount surface, and the stop valve is disposed to be pushed/pulled with respect to the stop valve mount surface in a vertical direction.

Specifically, the stop valve base includes a stop valve hole extending from the stop valve mount surface, and a first hole of the supply communication hole, which is branched from the supply passage to be communicated with the stop valve hole, and a second hole of the supply communication hole, which is directed from the stop valve hole to the valve mount surface are opened at different positions of the stop valve hole in an axial direction. The stop valve includes a spool shaped valve portion slidably inserted into the stop valve hole, and an operation portion protruding above the stop valve mount surface. The valve portion includes a plurality of seal members for allowing and blocking a communication between the holes. When the stop valve is in a first operation position, the first hole and the second hole are communicated via the stop valve hole by the seal members. When the stop valve is in a second operation position, the communication between the first hole and the second hole is blocked by the seal members.

Preferably, the stop valve includes three seal members at a proximal end portion, an intermediate portion and a leading end portion of the valve portion. In the first operation position, the first hole and the second hole are communicated with an area between the intermediate seal member and the proximal end seal member, or the leading end seal member to allow the holes to be communicated. In the second operation position, the second hole and the first hole are separately communicated with the area between the intermediate seal member and the proximal end seal member, and an area between the intermediate seal member (30b) and the leading end seal member such that the communication between the holes is blocked.

Preferably, the stop valve is held in the first operation position or the second position by balancing a fluid pressure force acting in axial directions of the stop valve.

In the structure, the stop valve is pushed to open the supply communication hole in the first operation position, and the stop valve is pulled to close the supply communication hole in the second operation position.

The structure may be provided with lock members for locking the stop valve into the first operation position and/or the second operation position.

In the present invention, the stop valve is attached to the stop valve mount surface formed on the stop valve base so as to be positioned selectively between a first operation position for opening the supply communication hole under pushing/ pulling force applied from the side with the solenoid valve and a second operation position for closing the communication hole. Unlike the generally employed structure where the stop valve is screwed into the side surface of the manifold base so as to be laterally retractable through the rotating operation, the stop valve may be easily and quickly operated selectively by performing a simple linear operation of pushing/pulling in the wide space above the solenoid valve apparatus.

BRIEF DESCRIPTION OF THE DRAWINGS

FIG. 12 is a sectional view of a generally employed solenoid valve apparatus.
FIG. 13 is a sectional view of the generally employed solenoid valve apparatus having the operation position of the stop valve different from the one shown in FIG. 12.

BEST MODE FOR CARRYING OUT THE INVENTION

FIGS. 1 to 5 show a manifold type solenoid valve apparatus having stop valve according to a first embodiment of the present invention. The solenoid valve apparatus includes a single manifold base 1, plural solenoid valves 2 installed on the manifold base 1, a stop valve base 3 connected to a side surface of the manifold base 1, and a plurality of stop valves 4 as many as the solenoid valves 2, which are attached to the stop valve base 3.

Figure 5:
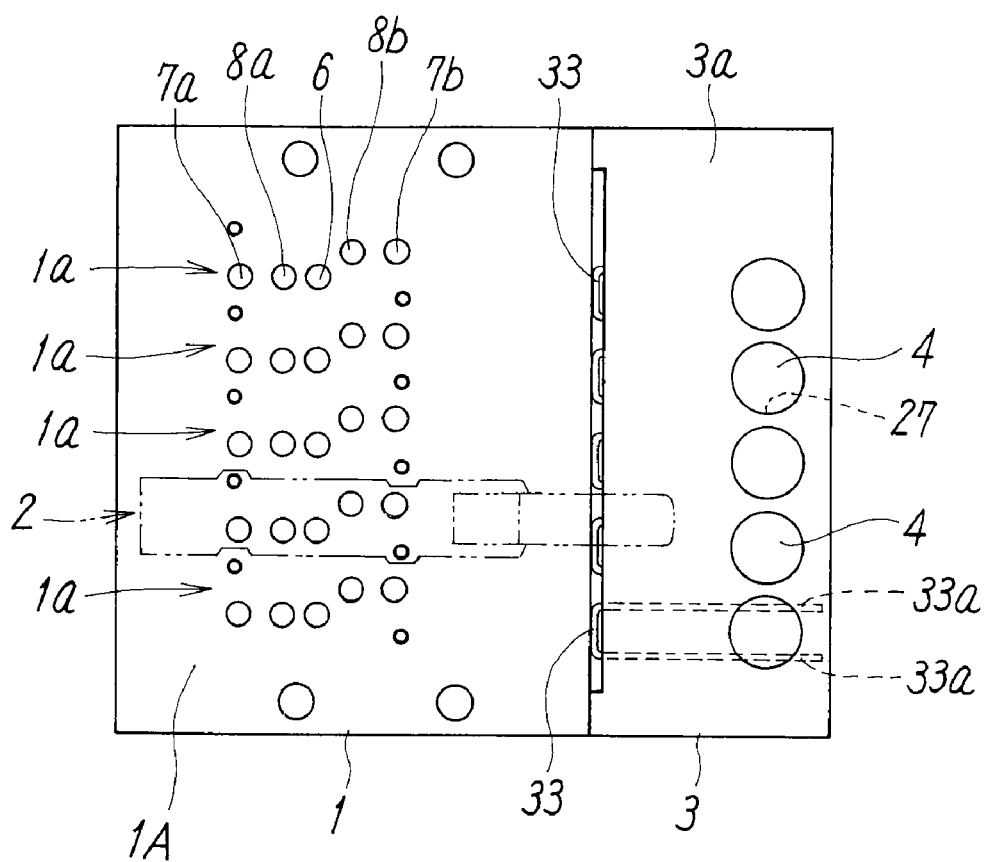
FIG. 5 is a plan view of the solenoid valve apparatus in the state where the solenoid valve is removed.

The manifold base 1 has a block body long in one direction with a rectangular or similar cross section. It has a flat upper surface as a valve mount surface 1A which includes plural valve mount regions 1a for accommodating the respective solenoid valves 2 as shown in FIG. 5. The valve mount surface 1A is not clearly divided into valve mount regions with boundary lines. However, it is possible to divide the valve mount surface with specific marks if necessary.

Figure 2:
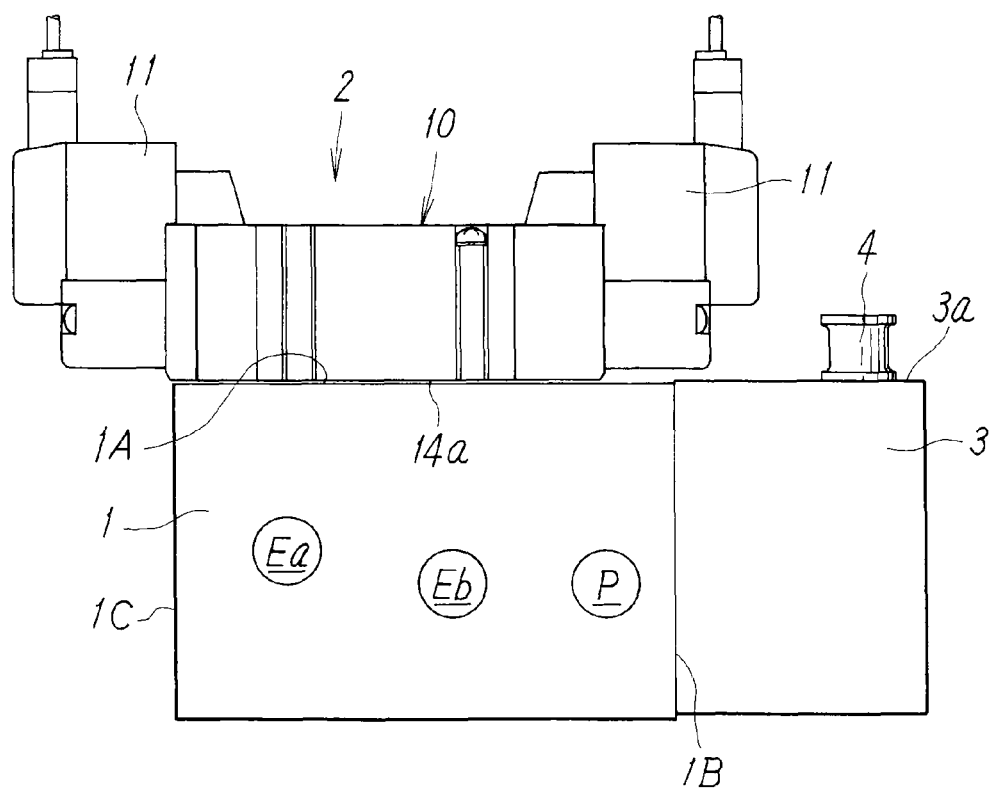
FIG. 2 is a side view of FIG. 1.
Figure 3:
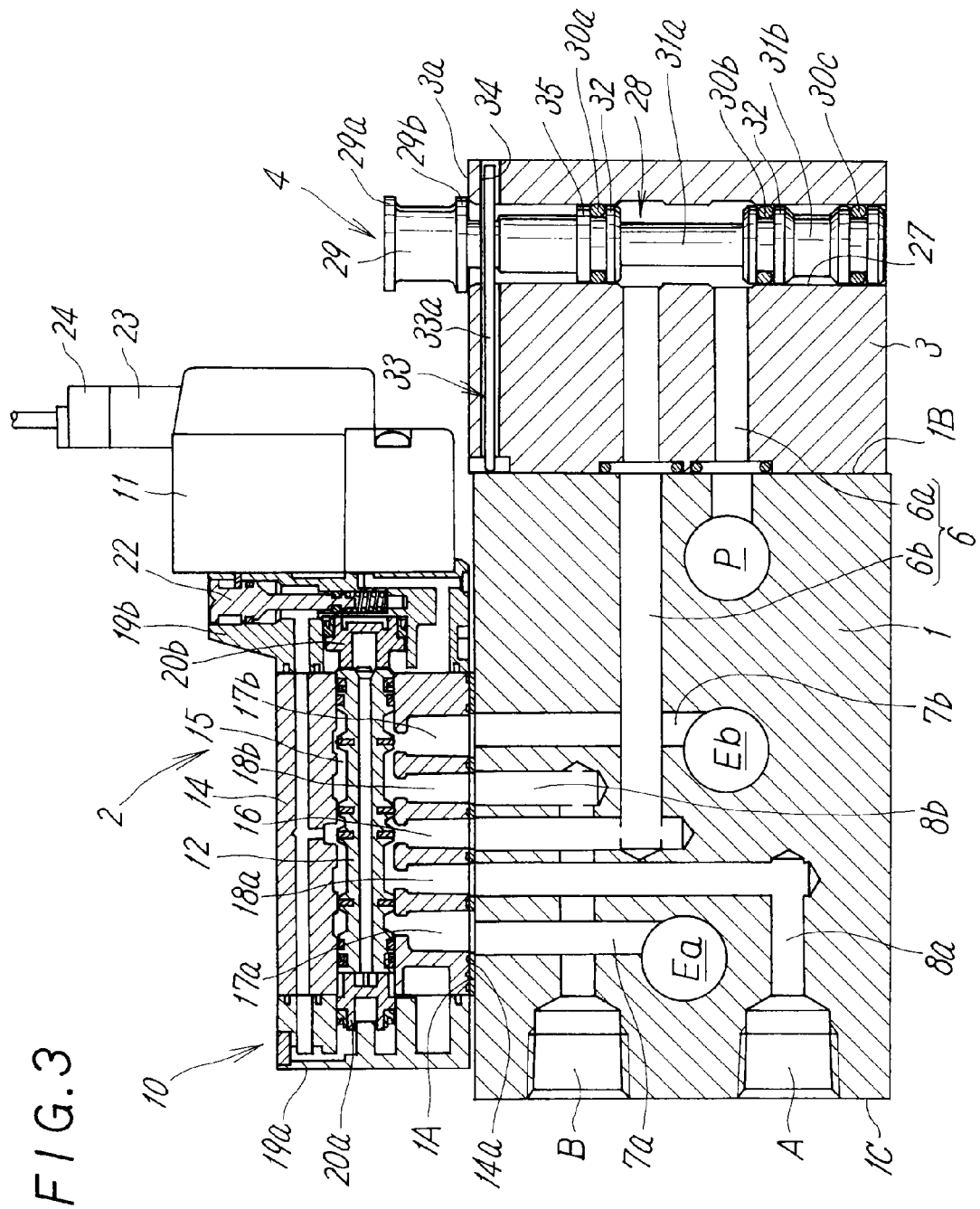
FIG. 3 is a sectional view of FIG. 1.
Figure 4:
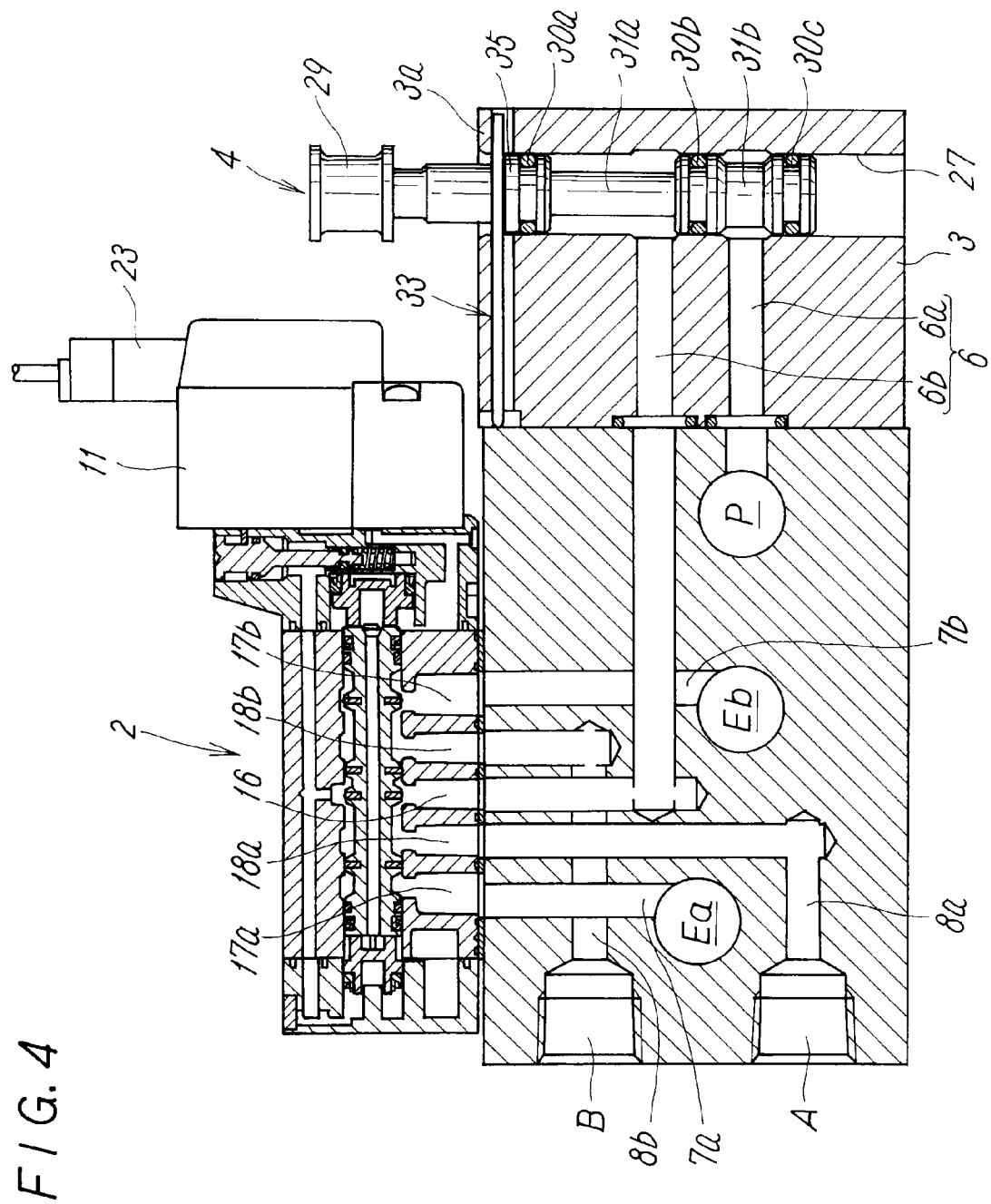
FIG. 4 is a sectional view of FIG. 1 showing a state where an operation position of the stop valve is different from the one shown in FIG. 3.

Referring to FIGS. 2 to 4, a single supply passage P for centrally supplying the pressure fluid such as air and liquid to the respective solenoid valves 2, and two first and second discharge passages Ea and Eb for discharging the pressure fluid from the respective solenoid valves 2 are formed within the manifold base 1, which extend from one end side to the other end side in an axial direction (longitudinal direction). Supply communication hole 6 and discharge communication holes 7a and 7b are branched from the supply passage P and the discharge passages Ea and Eb, respectively. Each end of the communication holes 6, 7a and 7b is opened to each of the valve mount regions 1a on the valve mount surface 1A so as to be communicated with the holes corresponding to the respective solenoid valves.

In the aforementioned case, the discharge communication holes 7a and 7b pass inside the manifold base 1 to reach the valve mount surface 1A. Meanwhile, the supply communication hole 6 extends from the manifold base 1 to pass inside the stop valve base 3, and further to pass inside the manifold base 1 to reach the valve mount surface 1A.

The supply passage P is formed at a position close to a first side surface 1B of the manifold base 1 for easily positioning the supply communication hole 6. The first discharge passage Ea is disposed at a position close to a second side surface 1C opposite the first side surface 1B. The second discharge passage Eb is formed at an intermediate position between the supply passage P and the first discharge passage Ea. Meanwhile, in the valve mount region 1a, the supply communication hole 6 is opened to the center between the first and the second discharge communication holes 7a and 7b.

Plural pairs of first and second outlet ports A and B for outputting the pressure fluid from the solenoid valve 2 to an actuator (not shown) are disposed as many as the solenoid valves 2 in the second side surface 1C of the manifold base 1. Output communication holes 8a and 8b communicated with the outlet ports A and B are opened to the valve mount region 1a at positions between the supply communication hole 6 and the first discharge communication hole 7a, and between the supply communication hole 6 and the second discharge communication hole 7b, respectively.

Figure 1:
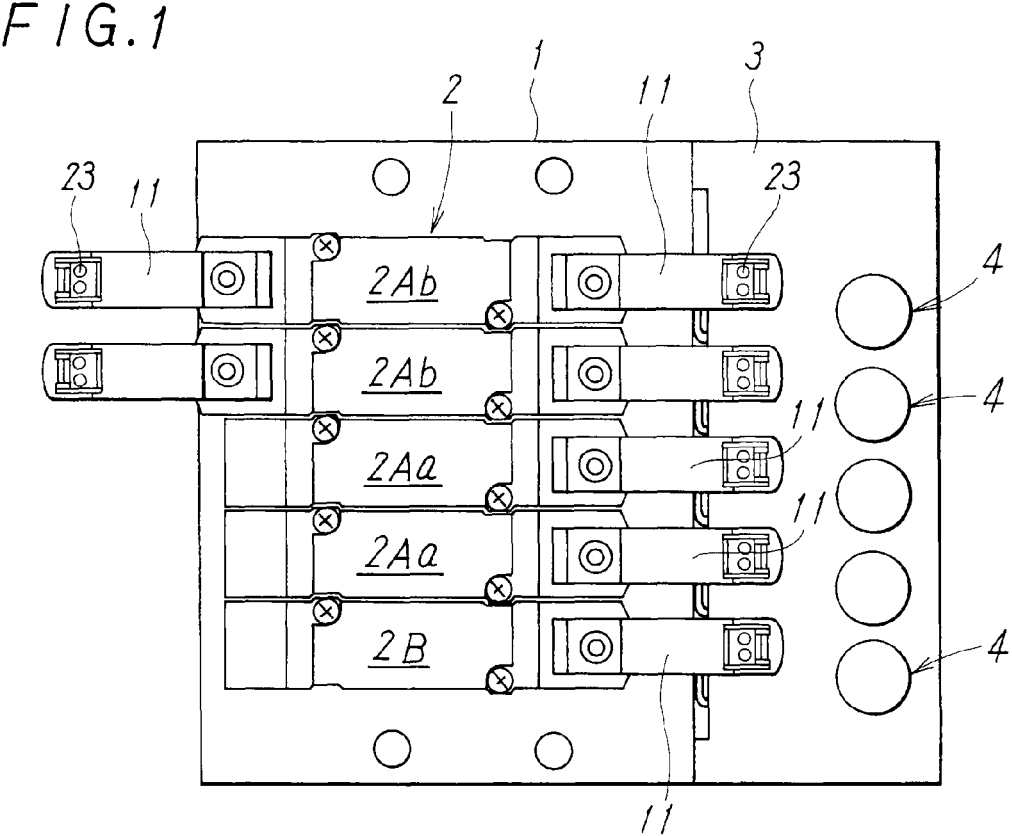
FIG. 1 is a plan view of a solenoid valve apparatus according to a first embodiment of the present invention.

Referring to FIG. 1, the plural solenoid valves 2 include single pilot type 5-port solenoid valves 2Aa each with a pilot valve 11, double pilot type 5-port solenoid valves 2Ab each with two pilot valves 11, and a single pilot type 3-port solenoid valve 2B. The combination of the plural types of solenoid valves 2 is not limited to the one as described above. The solenoid valve of other type, for example, 4-port valve may be employed, or the solenoid valves of only one type may also be employed. As each structure of the solenoid valves 2Aa, 2Ab and 2B is known, and is not directly related to the feature of the present invention, the structure of the single pilot type 5-port solenoid valve 2Aa will be described as an exemplary valve shown in FIGS. 3 and 4.

In the case except that the solenoid valves 2Aa, 2Ab and 2B with different types are required to be distinguished, the solenoid valve will be designated with the common reference number "2".

A housing 14 of a main valve portion 10 of the solenoid valve 2 has substantially a rectangular cross section with laterally long shape, in which a valve hole 15 is formed to extend in the axial (longitudinal) direction. A spool 12 is slidably stored in the valve hole 15. The valve hole 15 includes one supply hole 16, two output holes 18a, 18b at both sides of the supply hole 16, and two discharge holes 17a, 17b at both sides of the output holes such that the passage defined by the holes may be selected by the spool 12.

A connection surface 14a with a rectangular and substantially flat shape is formed on the lower surface of the housing 14 so as to be mounted on each of the valve mount regions 1a on the manifold base 1. The supply hole 16, two output holes 18a, 18b and two discharge holes 17a, 17b are formed in the connection surface 14a such that those holes are communicated with the supply communication hole 6, two output communication holes 8a, 8b and two discharge communication holes 7a, 7b on the valve mount region 1a, respectively when installing the solenoid valves 2 onto the valve mount regions 1a via a gasket.

Piston covers 19a, 19b are attached to both ends of the housing 14 in the axial (longitudinal) direction. Pistons 20a, 20b are disposed between the piston covers 19a, 19b and the end surface of the spool 12, respectively. The first piston 20a stored in the first piston cover 19a has a radius smaller than that of the second piston 20b stored in the second piston cover 19b.

In the state where the pilot fluid is constantly applied from the supply hole 16 to the back surface of the first piston 20a with smaller radius, the pilot valve 11 is turned ON and OFF to allow/block supply of the pilot fluid to the back surface of the second piston 20b with larger radius. Then the spool 12 is driven by the fluid pressure force caused by the difference in the pressure receiving area between the small piston 20a and the large piston 20b, thus switching the communication state among the holes 16, 18a, 18b, 17a, and 17b.

When the spool 12 is in the switching position shown in FIG. 3, the supply hole 16 and the first output hole 18a, and the second output hole 18b and the second discharge hole 17b are communicated, respectively such that the pressure fluid from the supply passage P is output from the first output port A via the supply communication hole 6, the supply hole 16, the first output hole 18a and the first output communication hole 8a. Meanwhile, the pressure fluid from the second outlet port B is discharged outside from the second discharge passage Eb via the second output communication hole 8b, the second output hole 18b, the second discharge hole 17b, and the second discharge communication hole 7b.

When the spool 12 moves to a switching position opposite the one shown in FIG. 3, the supply hole 16 and the second output hole 18b, and the first output hole 18a and the first discharge hole 17a are communicated, respectively such that the pressure fluid from the second outlet port B is output, and the pressure fluid from the first outlet port A is discharged outside from the first discharge passage Ea.

An operation member 22 for manual operations shown in the drawing is used for manually realizing the state where the electric current is applied to the pilot valve 11.

The pilot valve 11 is attached to the main valve portion 10 via the piston cover 19b at the second piston 20b, and has a power receiving connector 23 on the upper surface. A power feeding connector 24 connected to a controller is detachably attached to the power receiving connector 23 in the vertical direction.

The double pilot type 5-port solenoid valve 2Ab allows two pilot valves 11, 11 disposed at both sides of the main valve portion 10 to be turned ON and OFF alternately such that the pressure fluid is supplied to/discharged from the back surfaces of those two pistons 20a, 20b alternately for switching the spool 12. In this case, the two pistons 20a and 20b may have either the same or different radius.

The 3-port solenoid valve 2B has substantially the same basic structure as that of the 5-port solenoid valve 2Aa except the smaller number of ports. When installing the 3-port solenoid valve 2B on the manifold base 1, one of unused discharge communication holes 7a and 7b, and one of unused output communication holes 8a and 8b among those 5 opened communication holes of 6, 7a, 7b, 8a, and 8b are closed with the gasket or the other blanking plate.

The stop valve base 3 has a rectangular cross section with laterally long block shape, which is secured to the first side surface 1B of the manifold base 1 with a bolt and a screw. A substantially flat stop valve mount surface 3a is formed at least partially on the upper surface of the stop valve base 3. The stop valve mount surface 3a is disposed to a side of the valve mount surface 1A of the manifold base 1 in the same direction (upward) as that of the valve mount surface 1A. The stop valve mount surface 3a does not have to be disposed in the same direction as that of the valve mount surface 1A completely. It may be slightly inclined with respect to the valve mount surface 1A as the case may be. Preferably, the stop valve mount surface 3a is on the same level as the valve mount surface 1A. However, the height of the stop valve mount surface 3a may be different from that of the valve mount surface 1A. In this case, it is preferable to reduce the height difference as small as possible.

A circular stop valve hole 27 vertically extending from the stop valve mount surface 3a is formed in the stop valve base 3. The first hole 6a branched from the supply passage P and communicated with the stop valve hole 27 and a second hole 6b extending from the stop valve hole 27 toward the valve mount surface 1A are formed at different positions in the axial direction of the stop valve hole 27.

The stop valve 4 is installed inside the stop valve hole 27 so as to have its position switchable under the force of pushing/pulling operation from the side with the solenoid valve 2. When the stop valve mount surface 3a is formed in the same direction as that of the valve mount surface 1A, the stop valve 4 is preferably operated in the direction vertical to the stop valve mount surface 3a (that is, the valve mount surface 1A).

The stop valve 4 includes a spool-shaped valve portion 28 slidably inserted in the stop valve hole 27, and an operation portion 29 which is connected to a proximal end of the valve portion 28 and protrudes above the stop valve mount surface 3a. Three seal members, that is, first to third seal members 30a, 30b and 30c are disposed at predetermined intervals from the proximal end to the leading end of the valve portion 28 for allowing and blocking communication between the first hole 6a and the second hole 6b of the supply communication hole 6. The distance between the first seal member 30a and the second seal member 30b is set such that the first hole 6a and the second hole 6b are communicated with a first bundle portion 31a between the seal members 30a and 30b. The distance between the second seal member 30b and the third seal member 30c is set such that only the first hole 6a is communicated with a second bundle portion 31b therebetween. In this case, the second hole 6b is communicated with the first bundle portion 31a.

Each radius (outer radius upon sealing) of the three seal members 30a, 30b and 30c is set to be the same such that each pressure receiving area in the axial direction of the stop valve 4 is the same in the first and the second bundle portions 31a and 31b, respectively. When the pressure fluid is introduced from the first hole 6a into the first and the second bundle portions 31a and 31b, the fluid pressure force acting on the stop valve 4 in the axial direction may be balanced to retain the stop valve 4 in its operational position.

The operation portion 29 with a short cylindrical shape has flange portions 29a and 29b at both ends in the axial direction. The flange portion 29a at the upper end is engaged with a user's finger to pull up the stop valve 4. The flange portion 29b at the lower end serving as a stopper is engaged with the edge of the stop valve hole 27 when the stop valve 4 is fully pushed so as to suppress further depression.

Preferably the stop valve 4 is disposed so as not to be overlapped with the solenoid valve 2 in the operation direction, that is, vertical to the stop valve mount surface 3a for the purpose of performing easy and smooth switching operation by applying the pushing/pulling force.

FIG. 3 shows a U-shaped clip type stopper 33 which is attached in a mount hole 34 in the stop valve base 3 in the direction across the stop valve 4, and is disposed to interpose the stop valve 4 by two arms 33a, 33a from both sides. When the stop valve 4 is fully pulled up, the arms 33a, 33a are engaged with an engagement portion 35 of the stop valve 4 so as to be held in the stopped position. The engagement portion 35 is commonly used with a land portion 32 to which the first seal member 30a is attached.

The stop valve 4 is pushed down to be brought into a first operation position as shown in FIG. 3, and is pulled up to be brought into a second operation position as shown in FIG. 4. When the stop valve 4 is in the first operation position, the first and the second holes 6a and 6b of the supply communication hole 6 are communicated with the first bundle portion 31a between the first seal member 30a at the proximal end of the stop valve 4 and the intermediate second seal member 30b, and accordingly, those holes 6a, 6b, that is, the supply communication hole 6 is in the communicated state via the stop valve hole 27. When the stop valve 4 is in the second operation position, the second hole 6b is communicated between the second seal member 30b and the first seal member 30a, and the first hole 6a is communicated between the second seal member 30b and the third seal member 30c at the leading end side. Accordingly, the holes 6a and 6b, that is, the supply communication hole 6 is in a non-communicated state by the second seal member 30b.

In the aforementioned case, the stop valve 4 either in the first or the second operation position is held therein by the balance of the fluid pressure force acting on the axial directions of the stop valve 4.

The solenoid valve apparatus with the aforementioned structure in the normal operation state for driving the actuator such as the fluid pressure cylinder with the solenoid valves 2 holds the stop valve 4 at the first operation position as shown in FIG. 3 under the pushing force. In this case, the supply communication hole 6 is in the opened state to allow the pressure fluid to flow from the supply passage P to the respective solenoid valves 2.

In the case where the solenoid valve apparatus and the actuator are subjected to maintenance service, or the solenoid valve 2 is replaced, the stop valve 4 corresponding to the subject solenoid valve 2 is pulled up so as to be switched to the second operation position. Then the first hole 6a and the second hole 6b of the supply communication hole 6 are blocked to be kept closed. So the pressure fluid is not supplied from the supply passage P to the solenoid valve 2 such that the required work is safely performed. When the work is finished, the stop valve 4 is pushed to be switched to the first operation position.

The solenoid valve apparatus allows the stop valve mount surface 3a directed in the same direction of the valve mount surface 1A of the manifold base 1 to be formed on the stop valve base 3. The stop valve 4 is disposed on the stop valve mount surface 3a so as to have its position switchable under the pushing/pulling force applied from the side with the solenoid valve 2, and preferably, under the pushing/pulling operation to the stop valve mount surface 3a from the vertical direction. Unlike the generally employed structure for laterally moving the stop valve screwed to the side surface of the manifold base through the rotating operation, the present invention allows the stop valve 4 to be easily and quickly operated. Especially, the space above the solenoid valve 2 is normally wide as no adjacent member for covering the solenoid valve 2 is disposed. The stop valve 4 is allowed to be operated in the aforementioned space through a simple and easy operation like pushing and pulling, resulting in excellent operability.

Figure 6:
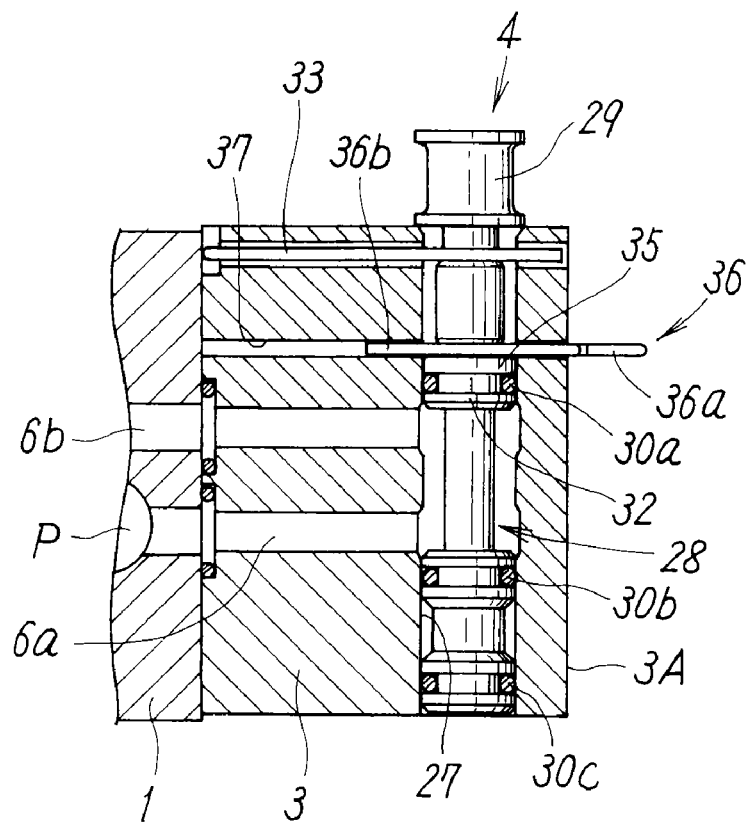
FIG. 6 is a sectional view showing an essential portion of a solenoid valve apparatus according to a second embodiment of the present invention.
Figure 8:
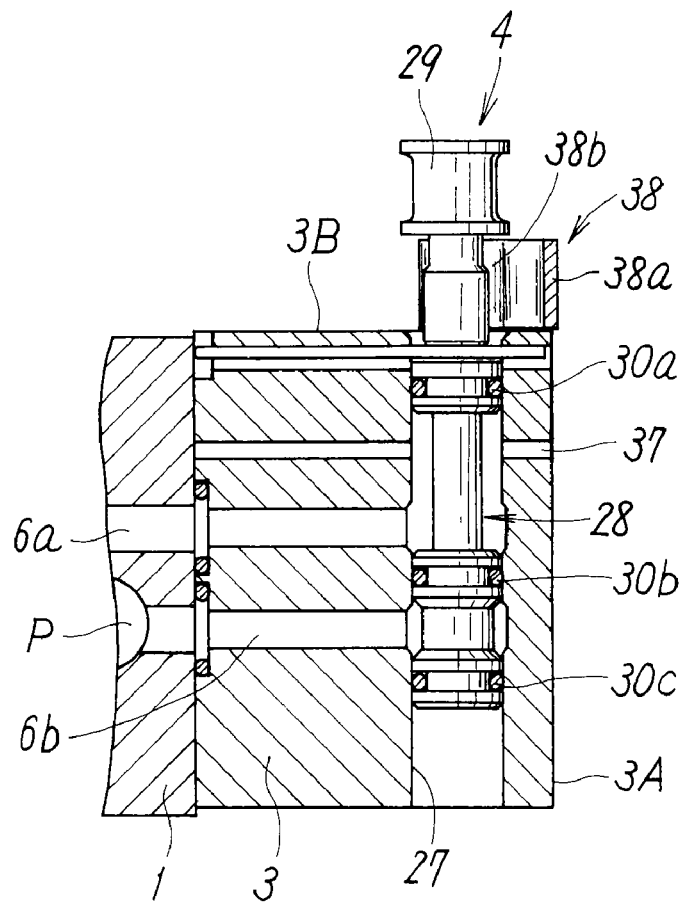
FIG. 8 is a sectional view showing an essential portion of a solenoid valve apparatus according to a third embodiment of the present invention.

In the first embodiment, the stop valve 4 is held in the first and the second operation positions by balancing the force of the fluid pressure exerted in the axial directions, and the lock mechanism for locking the stop valve 4 to the respective operation positions is not provided. However, the aforementioned lock mechanism may be provided for satisfying the specific safety requirement. FIGS. 6 and 8 are sectional views showing an essential portion of the solenoid valve apparatus with the above described lock mechanism as another embodiment. The portion not shown in the drawing is the same as the one described in the first embodiment shown in FIGS. 3 and 4.

Figure 7:
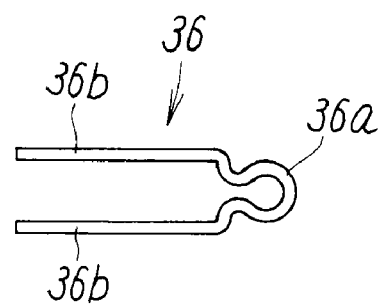
FIG. 7 is a plan view of a first lock member.

In a second embodiment shown in FIG. 6, the stop valve 4 is pushed to the first operation position so as to be locked by a first lock member 36. The first lock member 36 has a clip type member with a fork-like shape as shown in FIG. 7, which is formed by bending the wire, and includes a knob 36a with U-like or C-like shape and two lock arms 36b, 36b each extending from the knob 36a in parallel with each other.

Meanwhile, two lock holes 37 are formed laterally across the stop valve hole 27 each extending from a side surface 3A opposite the one to which the manifold base 1 is connected. The lock holes 37 are positioned across the area around the upper surface of the engagement portion 35 when the stop valve 4 is in the first operation position.

As the two lock arms 36b, 36b of the first lock member 36 are inserted into the lock holes 37, 37, respectively in the state where the stop valve 4 is switched to the first operation position, the lock arms 36b, 36b are engaged with the upper surface of the engagement portion 35 at left and right sides of the stop valve 4. As a result, the stop valve 4 is locked at the first operation position. The knob 36a of the first lock member 36 protrudes outside from the side surface 3A of the stop valve base 3.

The first lock member 36 is pulled out from the lock holes 37, 37 while gripping the knob 36a so as to pull up the stop valve 4 to be switched to the second operation position.

Figure 9:
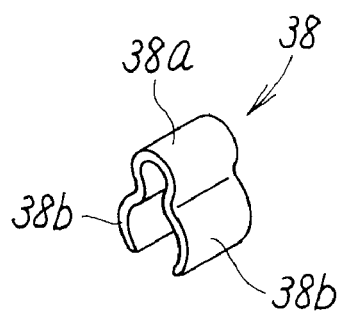
FIG. 9 is a perspective view showing a second lock member.

In a third embodiment shown in FIG. 8, the stop valve 4 is pulled up into the second operation position, and locked therein with a second lock member 38. The second lock member 38 is a clip member having a fork-like shape as shown in FIG. 9. It is formed by bending a metal or a synthetic resin elastic band plate, and includes a knob 38a with U-like or C-like shape and two circular lock arms 38b, 38b each extending from the knob 38a and bending outward.

When the two lock arms 38b, 38b of the second lock member 38 are elastically fit with the upper end of the valve portion 28 of the stop valve 4 in the second operation position, the lock arms 38b, 38b are interposed between the lower surface of the operation portion 29 and the upper surface 3B of the stop valve base 3 to be engaged with the operation portion 29. The operation portion 29 is then prevented from further being pushed down such that the stop valve 4 is locked in the second operation position. At this time, the knob 38a of the second lock member 38 protrudes sideways from the stop valve 4.

The second lock member 38 may be removed sideways while gripping the knob 38a such that the stop valve 4 is pushed down to be brought into the first operation position.

The first lock member 36 and the second lock member 38 are not necessarily required to be disposed together, and one of those members may be provided. When the stop valve 4 is required to be locked only in the first operation position, only the first lock member 36 may be provided. When the stop valve 4 is required to be locked only in the second operation position, only the second lock member 38 may be provided.

Figure 10:
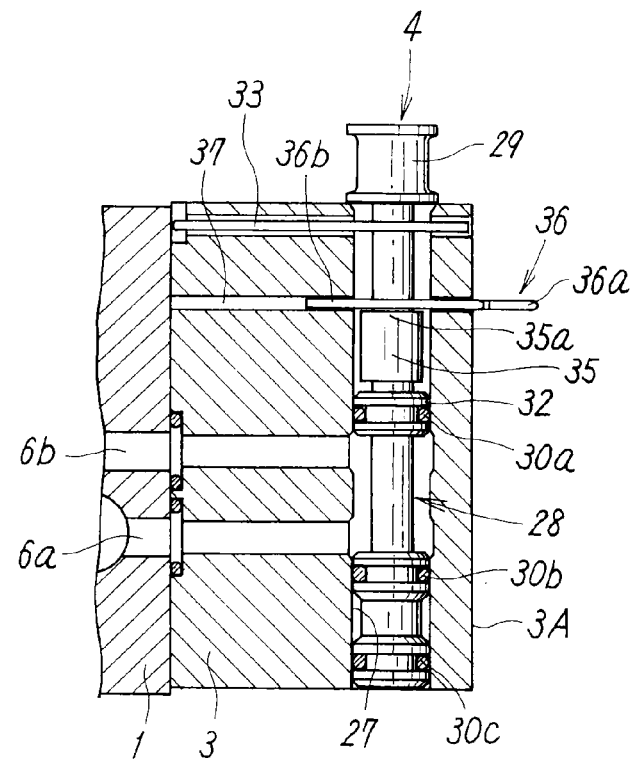
FIG. 10 is a sectional view showing an essential portion of a solenoid valve apparatus according to a fourth embodiment of the present invention.
Figure 11:
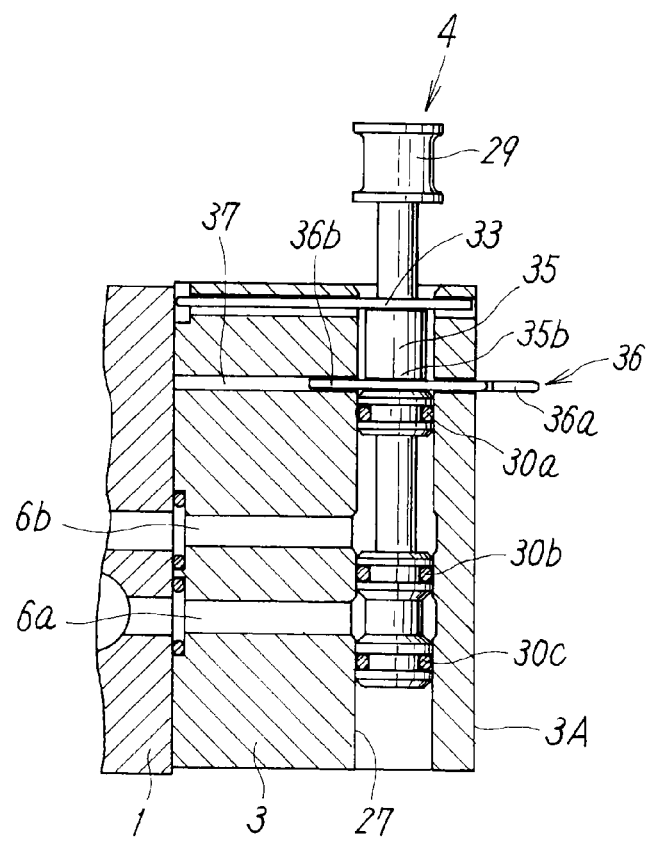
FIG. 11 is a sectional view showing an essential portion having the operation position of the stop valve different from the one shown in FIG. 10.

In a fourth embodiment, only one lock member may be used to lock the stop valve 4 into the first and the second operation positions as shown in FIGS. 10 and 11. In the fourth embodiment, the valve portion 28 of the stop valve 4 is provided with the engagement portion 35 with a short cylindrical shape independently from the land portion 32 to which the first seal member 30a is attached. Furthermore, the lock hole 37 as described in the second embodiment is formed in the stop valve base 3 such that the switching operation of the stop valve 4 allows the engagement portion 35 to move vertically over the rock hole 37. The axial length of the engagement portion 35 is shorter than the operation stroke of the stop valve 4 by the amount corresponding to the radius of the lock hole 37.

The lock member 36 with the same structure as the one shown in FIG. 7 is inserted into the lock hole 37 when the stop valve 4 is in the operation position such that the lock member 36 is engaged with an upper or a lower portion of the engagement portion 35, and the stop valve 4 is locked to suppress the switching operation.

Referring to FIG. 10, when the stop valve 4 is pushed into the first operation position, the engagement portion 35 is positioned below the lock hole 37, and an upper end 35a of the engagement portion 35 becomes adjacent to the lock hole 37. When the lock member 36 is inserted into the lock hole 37, it is engaged with the upper end 35a of the engagement portion 35 to suppress the switching operation of the stop valve 4 into the second operation position under the pulling force.

When the stop valve 4 is in the second operation position as shown in FIG. 11, the engagement portion 35 is positioned above the lock hole 37, and a lower end 35b is adjacent to the lock hole 37. The lock member 36 is inserted into the lock hole 37 to allow the lock member 36 to be engaged with the lower end 35b of the engagement portion 35 to suppress the switching operation of the stop valve 4 into the first operation position under the pushing force.

In the respective embodiments, the stop valve 4 is pushed down into the first operation position, and is pulled up into the second operation position. Conversely, however, the stop valve 4 may be pushed down into the second operation position, and may be pulled up into the first operation position. In this case, the interval relationship with respect to the distance between the first seal member 30a and the second seal member 30b, and the distance between the second seal member 30b and the third seal member 30c will be inverted to the relationship of the aforementioned embodiment.

The solenoid valve apparatus according to the embodiment is of a base pipe type having the outlet port mounted on the manifold base. However, it may be formed as a direct pipe type. The solenoid valve apparatus of direct pipe type may be provided for the respective solenoid valves without disposing the outlet port to the manifold base as the generally employed structure shown in FIG. 12.

The present invention may be applied to the structure having a single solenoid valve and a single stop valve 4.

The invention claimed is:

1. A manifold-type solenoid valve apparatus having stop valve which includes a manifold base having a valve mount surface on which a solenoid valve is mounted, the solenoid valve installed on the valve mount surface, a stop valve base connected to the manifold base, and a stop valve attached to the stop valve base, wherein:

the manifold base includes a supply passage and discharge passages extending inside the manifold base, and a supply communication hole and discharge communication holes branched from the supply passage and the discharge passages to be opened to the valve mount surface, and the supply communication hole is formed to reach the valve mount surface via the stop valve base; and the stop valve base includes a stop valve mount surface on which the stop valve is installed so as to be switchable between a first operation position to open the supply communication hole and a second operation position to close the communication hole by pushing and pulling from a side on which the solenoid valve is provided.

2. The solenoid valve apparatus according to claim 1, wherein:

the stop valve mount surface is formed to a side of the valve mount surface in a same direction as that of the valve mount surface; and the stop valve is disposed so as to be pushed/pulled in a direction perpendicular to the stop valve mount surface.

3. The solenoid valve apparatus according to claim 1, wherein:

the stop valve base includes a stop valve hole extending from the stop valve mount surface, and a first hole of the supply communication hole, which is branched from the supply passage to be communicated with the stop valve hole, and a second hole of the supply communication hole, which is directed from the stop valve hole to the valve mount surface are opened at different positions of the stop valve hole in an axial direction; and the stop valve includes a spool shaped valve portion slidably inserted into the stop valve hole, and an operation portion protruding above the stop valve mount surface, the valve portion includes a plurality of seal members for allowing and blocking a communication between the holes, when the stop valve is in a first operation position, the first hole and the second hole are communicated via the stop valve hole by the seal members, and when the stop valve is in a second operation position, the communication between the first hole and the second hole is blocked by the seal members.

4. The solenoid valve apparatus according to claim 2, wherein:

the stop valve base includes a stop valve hole extending from the stop valve mount surface, and a first hole of the supply communication hole, which is branched from the supply passage to be communicated with the stop valve hole, and a second hole of the supply communication hole, which is directed from the stop valve hole to the valve mount surface are opened at different positions of the stop valve hole in an axial direction; and the stop valve includes a spool shaped valve portion slidably inserted into the stop valve hole, and an operation portion protruding above the stop valve mount surface, the valve portion includes a plurality of seal members for allowing and blocking a communication between the holes, when the stop valve is in a first operation position, the first hole and the second hole are communicated via the stop valve hole by the seal members, and when the stop valve is in a second operation position, the communication between the first hole and the second hole is blocked by the seal members.

5. The solenoid valve apparatus according to claim 3, wherein the stop valve includes three seal members at a proximal end portion, an intermediate portion and a leading end portion of the valve portion, in the first operation position, the first hole and the second hole are communicated with an area between the intermediate seal member and the proximal end seal member, or the leading end seal member to allow the holes to be communicated, and in the second operation position, the second hole and the first hole are separately communicated with the area between the intermediate seal member and the proximal end seal member, and an area between the intermediate seal member and the leading end seal member such that the communication between the holes is blocked.

6. The solenoid valve apparatus according to claim 4, wherein the stop valve includes three seal members at a proximal end portion, an intermediate portion and a leading end portion of the valve portion, in the first operation position, the first hole and the second hole are communicated with an area between the intermediate seal member and the proximal end seal member, or the leading end seal member to allow the holes to be communicated, and in the second operation position, the second hole and the first hole are separately communicated with the area between the intermediate seal member and the proximal end seal member, and an area between the intermediate seal member and the leading end seal member such that the communication between the holes is blocked.

7. The solenoid valve apparatus according to claim 1, wherein the stop valve is held in the first operation position or the second position by balance of a fluid pressure force acting in both axial directions of the stop valve.

8. The solenoid valve apparatus according to claim 2, wherein the stop valve is held in the first operation position or the second position by balance of a fluid pressure force acting in both axial directions of the stop valve.

9. The solenoid valve apparatus according to claim 3, wherein the stop valve is held in the first operation position or the second position by balance of a fluid pressure force acting in both axial directions of the stop valve.

10. The solenoid valve apparatus according to claim 4, wherein the stop valve is held in the first operation position or the second position by balance of a fluid pressure force acting in both axial directions of the stop valve.

11. The solenoid valve apparatus according to claim 1, further comprising lock members for locking the stop valve into the first operation position and/or the second operation position.

12. The solenoid valve apparatus according to claim 2, further comprising lock members for locking the stop valve into the first operation position and/or the second operation position.

13. The solenoid valve apparatus according to claim 3, further comprising lock members for locking the stop valve into the first operation position and/or the second operation position.

14. The solenoid valve apparatus according to claim 4, further comprising lock members for locking the stop valve into the first operation position and/or the second operation position.

15. The solenoid valve apparatus according to claim 11, wherein the lock member has a fork-like clip structure, the stop valve includes an engagement portion with which the lock member is engaged, the stop valve base has a lock hole for accommodating an insertion of the lock member formed in a direction across the stop valve, and the lock member is inserted into the lock hole such that the lock member is engaged with the engagement portion to lock the stop valve in the first and/or the second operation position to which the stop valve has been displaced.

16. The solenoid valve apparatus according to claim 12, wherein the lock member has a fork-like clip structure, the stop valve includes an engagement portion with which the lock member is engaged, the stop valve base has a lock hole for accommodating an insertion of the lock member formed in a direction across the stop valve, and the lock member is inserted into the lock hole such that the lock member is engaged with the engagement portion to lock the stop valve in the first and/or the second operation position to which the stop valve has been displaced.

17. The solenoid valve apparatus according to claim 13, wherein the lock member has a fork-like clip structure, the stop valve includes an engagement portion with which the lock member is engaged, the stop valve base has a lock hole for accommodating an insertion of the lock member formed in a direction across the stop valve, and the lock member is inserted into the lock hole such that the lock member is engaged with the engagement portion to lock the stop valve in the first and/or the second operation position to which the stop valve has been displaced.

18. The solenoid valve apparatus according to claim 14, wherein the lock member has a fork-like clip structure, the stop valve includes an engagement portion with which the lock member is engaged, the stop valve base has a lock hole for accommodating an insertion of the lock member formed in a direction across the stop valve, and the lock member is inserted into the lock hole such that the lock member is engaged with the engagement portion to lock the stop valve in the first and/or the second operation position to which the stop valve has been displaced.

19. The solenoid valve apparatus according to claim 1, wherein a position which the stop valve is pushed is the first operation position to open the supply communication hole, and a position which the stop valve is pulled is the second operation position to close the supply communication hole.

* * * * *